(12) United States Patent
Sokac et al.

(10) Patent No.: US 6,757,638 B2
(45) Date of Patent: Jun. 29, 2004

(54) COMPONENT FAULT DETECTION

(75) Inventors: Russell J. Sokac, Rochester, NY (US); Jose I. Quinones, Webster, NY (US)

(73) Assignee: Xerox Corporation, Stamford, CT (US)

( * ) Notice: Subject to any disclaimer, the term of this patent is extended or adjusted under 35 U.S.C. 154(b) by 115 days.

(21) Appl. No.: 10/056,495

(22) Filed: Jan. 28, 2002

(65) Prior Publication Data

US 2003/0144816 A1 Jul. 31, 2003

(51) Int. Cl.[7] .................. G06F 15/00; G06F 17/18; G11R 7/007
(52) U.S. Cl. ............. 702/179; 341/11; 369/124.14; 369/275.3; 701/29; 702/183
(58) Field of Search .............. 702/127, 179, 702/180, 181, 182, 196, 197, 199; 701/29, 35; 714/31, 46, 732; 399/8, 10; 369/124.14, 275.3

(56) References Cited

U.S. PATENT DOCUMENTS

| | | | |
|---|---|---|---|
| 4,757,463 A | | 7/1988 | Ballou et al. .................. 701/35 |
| 4,980,882 A | * | 12/1990 | Baer et al. ............... 369/275.3 |
| 5,010,551 A | | 4/1991 | Goldsmith et al. ........... 714/46 |
| 5,053,815 A | * | 10/1991 | Wendell ....................... 399/10 |
| 5,420,849 A | * | 5/1995 | Matsueda ............... 369/124.14 |
| 5,652,754 A | | 7/1997 | Pizzica ....................... 714/732 |
| 5,887,216 A | * | 3/1999 | Motoyama ..................... 399/8 |
| 6,070,253 A | | 5/2000 | Tavallaei et al. .............. 714/31 |
| 6,115,656 A | | 9/2000 | Sudolsky ...................... 701/35 |
| 6,401,054 B1 | * | 6/2002 | Andersen ..................... 702/179 |
| 6,405,108 B1 | * | 6/2002 | Patel et al. ................... 701/29 |

FOREIGN PATENT DOCUMENTS

| | | |
|---|---|---|
| JP | 04172537 | 6/1992 |
| JP | 06308204 | 11/1994 |
| JP | 06331710 | 12/1994 |
| JP | 07028368 | 1/1995 |
| JP | 00347892 | 12/2000 |

OTHER PUBLICATIONS

Mir et al., "Phase angle diagnostic for sinusoidal controlled electric machine", Pub. No.: US 2003/0046028 A1, Pub-Date: Mar. 6, 2003, FiledDate: Ausust 30, 2001.*

* cited by examiner

Primary Examiner—John Barlow
Assistant Examiner—John Le

(57) ABSTRACT

A technique that uses component data, such as servo encoder feedback data, and calculates real time histograms on a production printed wire board assembly (PWBA). If the histograms are uploaded to a main controller at specific intervals during run, aberrant servo activity can be tracked over a period of time. This could lead to finding machine problems before they become serious enough to cause shutdowns.

14 Claims, 5 Drawing Sheets

COMPONENT FAULT DETECTION

BACKGROUND OF THE INVENTION

Servo systems are designed to run at a set velocity, which is monitored via an encoder mounted on the servo. If the servo operates above or below the set point, the servo controls can detect the aberrant behavior of the servo by, for example, sensing a corresponding deviation in encoder frequency and attempt to correct for the encoder frequency error. If the error is easily corrected by the system, the correction takes place and the servo continues to function. However, if the error in encoder frequency (velocity) begins to exceed certain limits, the control system will determine that it can no longer operate within specification. When this occurs, the controller typically disables the servo motor drive and issues an alert, such as, for example, a numerical code, to the main control system. This alert tells the main controller that the servo is no longer operating and that a fault has been declared.

The above sequence is a typical shutdown technique and reveals to the main control system that a servo hardware fault has occurred. No other information is passed on for evaluation to the tech rep or the customer. The problem that caused the error could well have been the motor hardware or could have been the load that is driven by the servo motor. If the problem is a marginal situation in either the load or the motor, determining the root cause could be difficult since faults might be intermittent. Also, there is no information stored in the system that could give a historical account of encoder frequency excursions that did not cause a shutdown. A history of encoder frequency values that shows poor behavior would be useful to service personnel, and there is thus a need for such a history. Tech reps or design engineers could use such a history to determine that, over a specified operating period, the frequency of the servo motor's deviations and the amplitude by which the motor had deviated from its set point.

SUMMARY OF THE INVENTION

An onboard microprocessor continuously monitors a component, such as an encoder, by sensing a characteristic of the component, such as encoder timing. The onboard microprocessor performs real time statistical calculations on the values of the component characteristic and stores data including the results of these calculations in a memory, such as a RAM of the microprocessor. The data can remain in the memory for later retrieval or can be uploaded to another location, such as a main controller. The uploads can be continuous or at intervals. The system can be configured so that only those values outside of normal limits would be stored for analysis.

In embodiments in which the component is an encoder, data collecting is facilitated by encoders being timed according to the microprocessor's clock. In embodiments, if encoder timing exceeds any specified limit, the information could be placed, for example, in an array in the microprocessor RAM; such an array is effectively a histogram. If technical support is on site, the representative could use the Serial Control Bus to collect the required data in real time. In embodiments using such a histogram, each data point could be put into a range bucket; since one would know what range the bucket included, one would simply increment an event count at a location on the histogram corresponding to the data point. Thus, the data can be represented by counters rather than real encoder values.

PREFERRED EMBODIMENT OF THE INVENTION

While this specification describes a technique that can record the encoder frequency excursions in real time on a printed wire board assembly (PWBA) in an operating environment, this is simply exemplary and one of ordinary skill in the art should realize that the technique can be applied to other types of machine components without departing from the scope of the invention.

Figure 1:
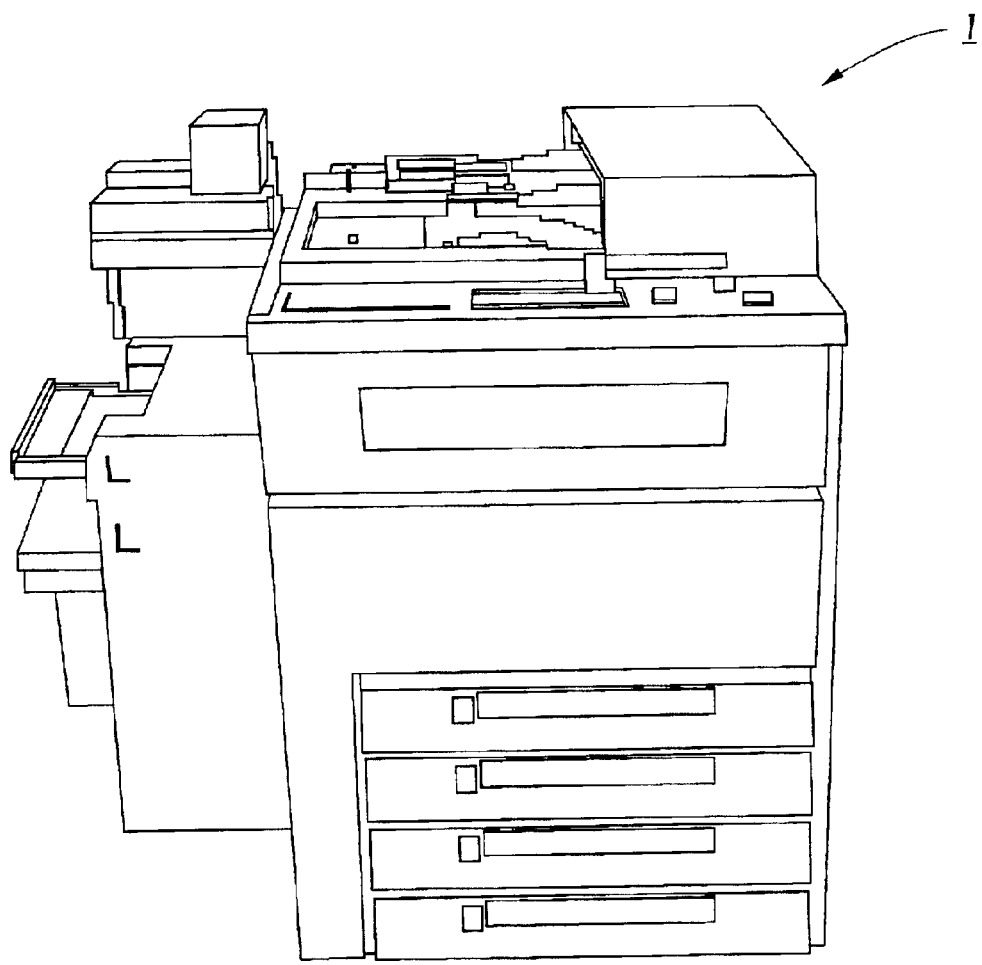
FIG. 1 shows a schematic of a machine in which embodiments can be employed.
Figure 2:
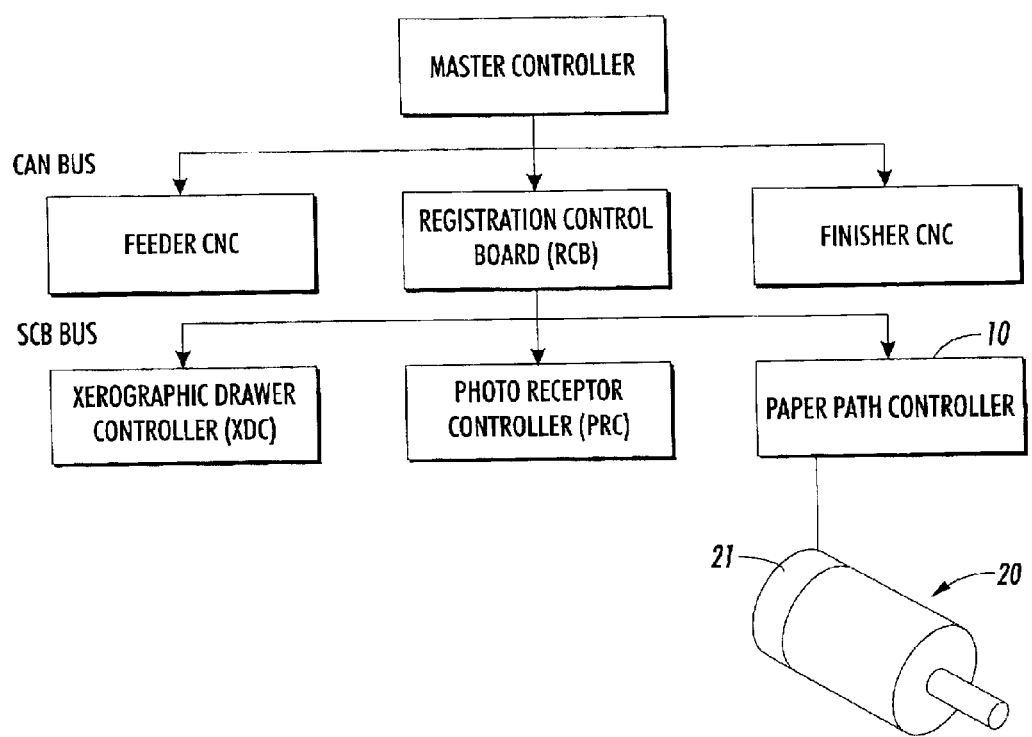
FIG. 2 shows a schematic of systems of a machine in which embodiments might be employed.

Embodiments can be employed in a printing machine 1, such as that shown in FIG. 1. Such printing machines typically include at least one main controller 10, as the controllers seen schematically, for example, in FIG. 2, that can, among other things, control a servo motor 20, as does the paper path controller 10, that can include a servo encoder 21. Such a main controller 10 typically includes at least one microprocessor 30, which will often include on-board random access memory (RAM) 31 or the like and/or can have access to expanded RAM 32 or the like. The microprocessor 30 can also be part of a microcontroller 40 that itself can include onboard RAM 41 or the like and/or can have access to expanded RAM 42 or the like.

The onboard microprocessor 30, in embodiments, continuously monitors a component 20, such as an encoder, by sensing a characteristic of the component, such as encoder timing of a servo encoder 21. In embodiments, precise servo specifications would demand a tolerance of ±0.1% to ±5%. The onboard microprocessor 30 performs real time statistical calculations on the values of the component characteristic and stores data including the results of these calculations in a memory, such as a RAM 31, 32 of the microprocessor. The data can remain in the memory for later retrieval or can be uploaded to another location, such as a main controller 10. The uploads can be continuous or at intervals. The system can be configured so that only those values outside of normal limits would be stored for analysis.

Figure 4:
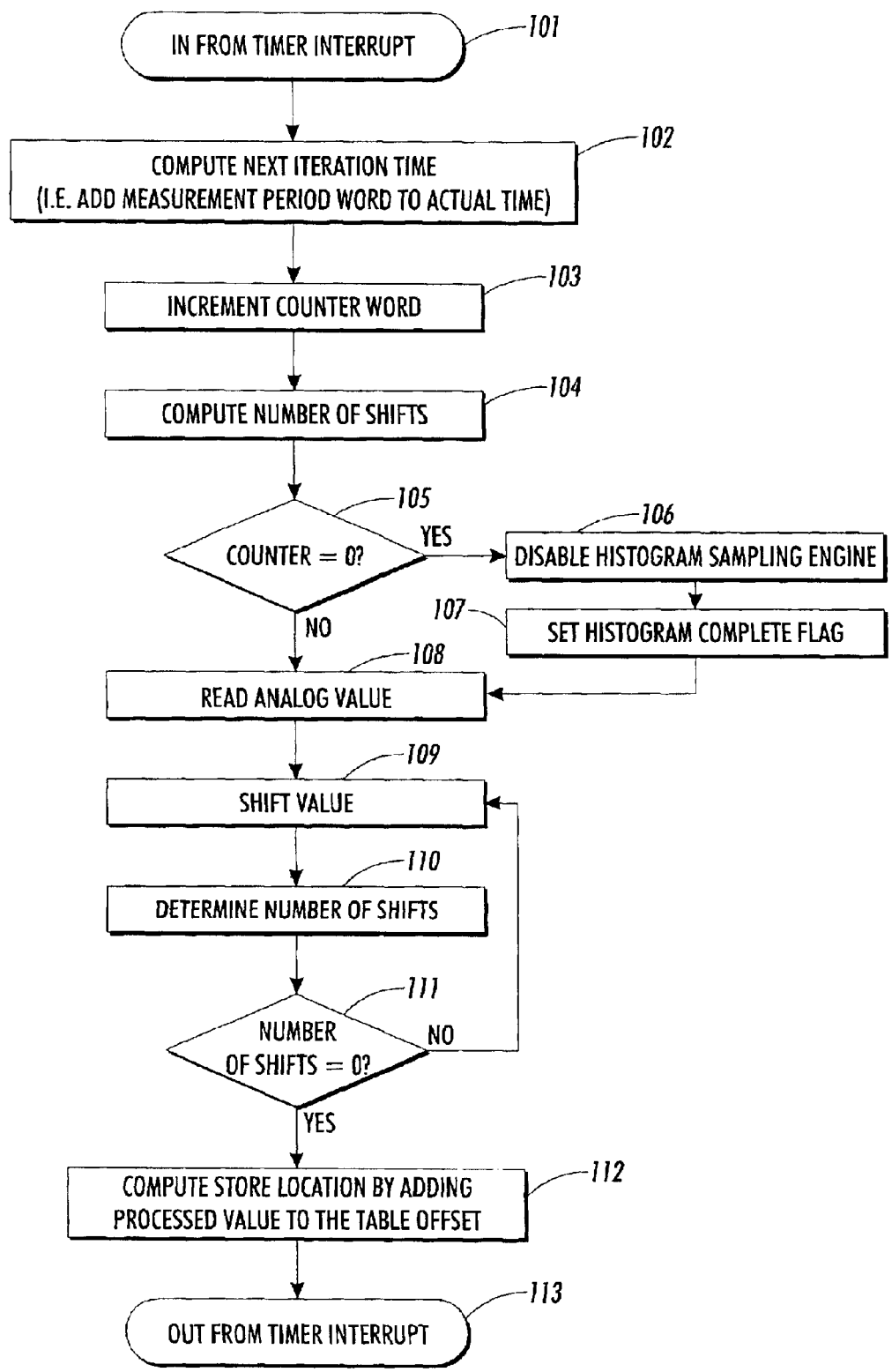
FIG. 4 shows a schematic chart illustrating a method that can be executed in embodiments of the invention.
Figure 5:
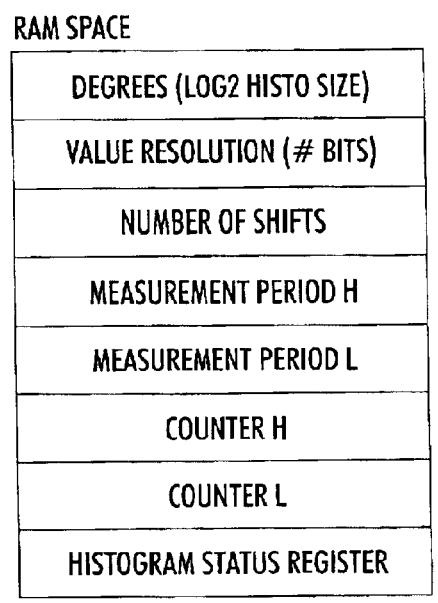
FIG. 5 is a schematic illustration of RAM usage in embodiments.
Figure 6:
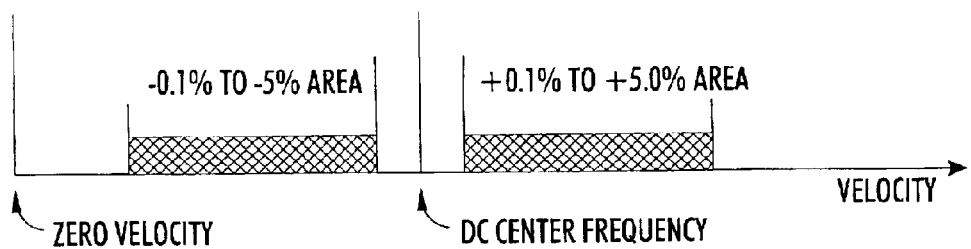
FIG. 6 is a schematic illustration of component aberrations in a histogram format using a servo motor encoder as an example.

In embodiments in which the component is an encoder 20, collecting the data should be relatively simple since each and every encoder connected to the microprocessor 30 is timed according to the microprocessor's clock. In embodiments, if encoder timing exceeds any specified limit, the information could be placed, for example, in an array in the microprocessor RAM 31, 32; such an array is effectively a histogram, an example of which is schematically illustrated in FIG. 4. If technical support is on site, a support representative could use the serial control bus 11 to collect the required data in real time. In embodiments using such a histogram, each data point could be put into a range bucket; since one would know what range the bucket included, one would simply increment an event count at a location on the histogram corresponding to the data point. Thus, the data would be represented by counters rather than real encoder values.

In embodiments in which other statistical values are needed, more RAM 31, 32, 41, 42 can be necessary and more processing time can be required. Thus, in such embodiments, the microprocessor 30 should be relatively fast and have RAM 31, 32 available internally or externally for the storage. For example, the microprocessor 30 could be an Intel P89C51RB2 with 256 bytes RAM and 256 bytes Flash on board, or the microprocessor 30 could be of another type with external RAM chips for the micro's use. Additionally, a microcontroller 40 with 1 kB of internal RAM could be used in the six cycle clock mode. Running in this mode essentially doubles the internal speed of the controller's 40 processing capabilities. Therefore, for example, a P89C51RD2 (with 1 KB internal RAM 41) by Intel could be used that would run at twice the normal speed. This would be more than enough to handle the required processing. Additionally, for example, standard, off-the-shelf external RAM integrated circuits 42 could be used to augment data storage. Any amount of external RAM 42 would then be placed on the board that would meet the required storage needs.

More real time would be needed to hand data from the target micro 30, 40 to the main controller 10. Also, traffic on the serial bus system 11 would increase in order to get the data across. The main control unit 10 would be responsible for decisions about the health of the system according to its analysis, which would require additional real time from the main unit 10.

The system main controller 10 can thus obtain a history of aberrant component events, such as aberrant motor encoder events. The main controller 10 could then make decisions about machine operation that could be communicated to, for example, service personnel. When a predetermined threshold of events is reached, for example, the machine diagnostics could alert service that a failure is eminent. Further, service could access this data, locally or remotely, and determine if further repairs are needed. The information obtained from the system could be used to determine the cause of an intermittent problem.

Figure 3:
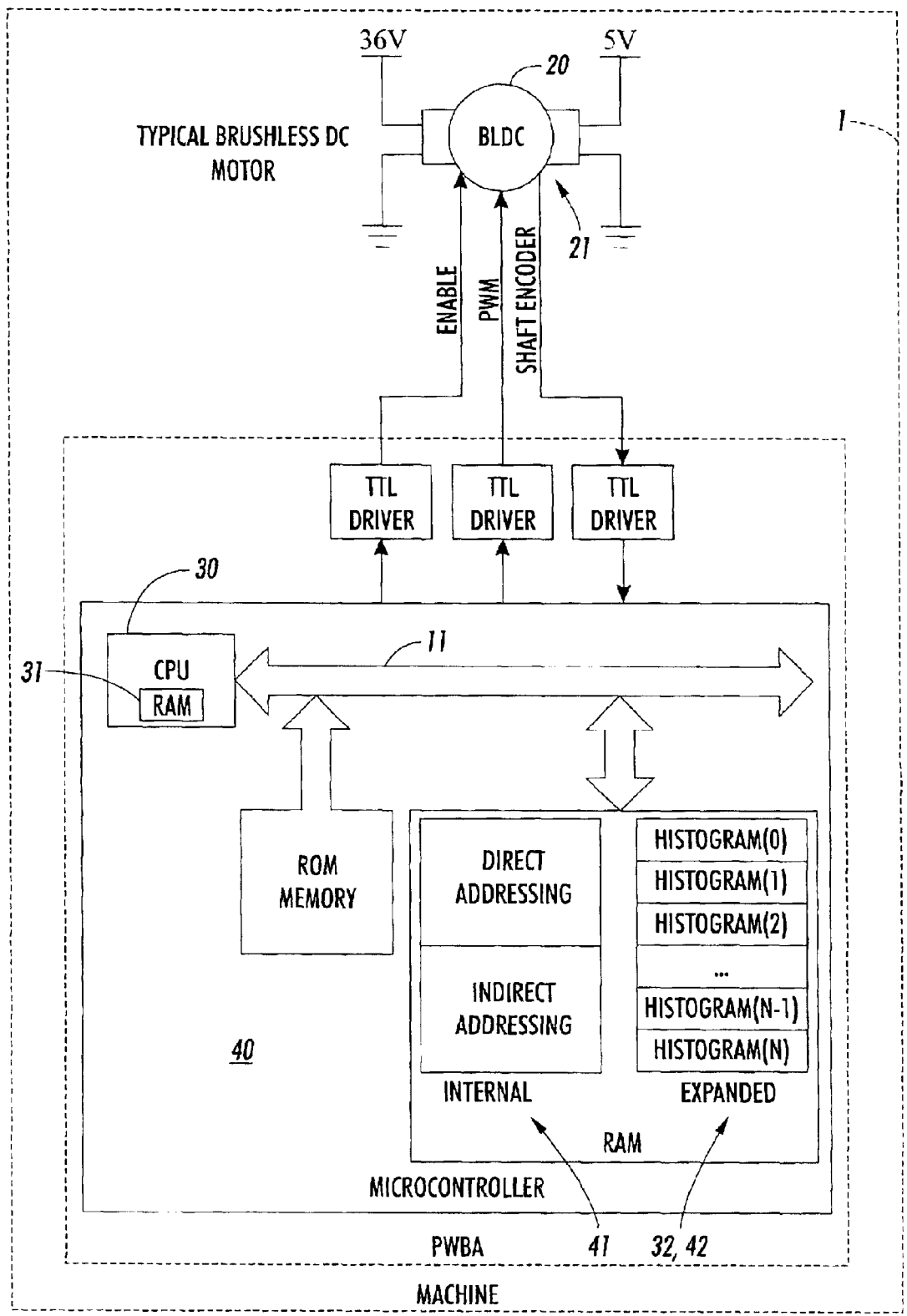
FIG. 3 shows a schematic of embodiments and the components they can include.

A schematic illustration of a method executed in embodiments is shown in FIG. 3. The method can start with an in from a timer interrupt, block 101, and proceed to computation of a next iteration time point, block 102. The time point can be determined by adding the value of the variable measurement period word to the actual time and is representative of the time point at which the next sample will be taken. The method can increment a counter, referred to as counter word in block 103, that keeps track of the number of reads performed for the histogram. The invention can compute the variable Number of Shifts, as illustrated in block 104, which represents how much a sample is modified to fit the predetermined size boundary; for example, an eight bit limit can be imposed for each read.

At some point, embodiments will assess the counter to determine if it's value is zero, as illustrated in block 105. When the value is zero, the sampling engine can be disabled and a flag can be set to indicate that the histogram is complete, as shown in blocks 106 and 107, respectively. Alternatively, when the value is not zero, embodiments can read an analog value, shift the value, and decrement the number of shifts, as shown in blocks 108, 109, and 110. If the number of shifts is unequal to zero, then blocks 109 and 110 repeat, as shown in block 111. When the number of shifts reaches zero, embodiments compute a storage location as illustrated in block 112; the location can be determined by adding a processed Value to a Table Offset, for example. Once the data is stored, embodiments exit as illustrated in block 113.

An example of an arrangement of RAM space can be seen in FIG. 4. As illustrated schematically in FIG. 4, the RAM 31, 32, 41, 42, can store values of the variables Degrees, Value Resolution, Number of Shifts, Measurement Period H, Measurement Period L, Counter H, Counter L, and a histogram status register. Degrees can be equal to LOG2 of the histogram size, which can be between 1 and 7 if the histogram size is represented in bytes or between 1 and 6 if the histogram size is represented in words. The variable Value Resolution represents a number of bits allowed per sample. For example, the resolution can be between 8 and 16 bits for some embodiments, though the particular resolution will depend upon the particular equipment implemented. The number of shifts can be determined as a difference between the value of Value Resoultion and Degrees thus:

Shifts=Value Resolution−Degrees.

While embodiments have been described in the context of monitoring a motor encoder 21, those of ordinary skill in the art should recognize that other components could be monitored using the method and apparatus described above. For example, this technique can be used on other applications such as sensor readings, power supply voltage readings, timing functions, and the recording of pulse width modulation (PWM) values. Data can be kept on almost any application that could help machine diagnostics. It could be accomplished at the firmware level as with the motor encoder and the data could be analyzed there or at the main control. Sensor pullin/pullout times and electromechanical clutch pullin/pullout times can be treated in the same manner. Power supply voltages can be monitored and any deviations be placed into their own histograms. Any device using PWM control would fit the algorithms of this technique. The histograms of all of these items, including paper path timing, could be stored on the microcontroller or microprocessor and read by the main control board or a remote computer at some convenient time.

Other modifications of the present invention may occur to those skilled in the art subsequent to a review of the present application, and these modifications, including equivalents thereof, are intended to be included within the scope of the present invention.

What is claimed is:

1. An intermittent aberrant component activity tracking method comprising:

continuously monitoring a component, the component comprising an encoder, wherein servo specifications of the encoder require a tolerance of ±0.1% to ±5%;

sensing a characteristic of the component;

performing real time statistical calculations using sensed values of the characteristic of the component; and storing, in a memory, data including results of the calculations indicative of a fault, wherein each data point of the data is put into a range bucket, and wherein the data are represented by a counter rather than a real encoder value.

2. The method of claim 1 further comprising providing for retrieval of the data.

3. The method of claim 1 further comprising uploading the data to a main controller at regular intervals.

4. The method of claim 1 wherein the sensed characteristic of the encoder is its dining.

5. The method of claim 1 wherein the component is a sensor.

6. The method of claim 1 further comprising using a serial control bus to retrieve the data in real time.

7. The method of claim 1 further including incrementing an event count at a respective location when a data point falls into a range bucket.

8. The method of claim 1 wherein the main controller analyzes the data as necessary.

9. The method of claim 1 wherein only data values outside of normal run limits would be recorded and studied.

10. A real time encoder frequency excursion recording method that can record excursions in real time on a product printed wire board assembly (PWBA) in an operating environment, the method comprising:

continuously monitoring the encoder timing, wherein servo specifications of the encoder require a tolerance of ±0.1% to ±5%;

doing real time statistical calculations; and storing the results of the calculations indicative of a fault in a memory for retrieval by service personnel or for uploading to the main controller at regular intervals during the run process, wherein each data point of the results is put into a range bucket, and wherein the data are represented by a counter rather than a real encoder value.

11. The method of claim 10 wherein only results values outside of normal run limits would be recorded and studied.

12. The method of claim 10 further comprising using a serial control bus to retrieve the data in real time.

13. The method of claim 10 further including incrementing an event count at a respective location when a data point falls into a range bucket.

14. The method of claim 10 wherein the main controller analyzes the data as necessary.

* * * * *